United States Patent [19]

Uffner et al.

[11] Patent Number: 4,545,699
[45] Date of Patent: Oct. 8, 1985

[54] PRIMER COMPOSITION FOR A LAMINATED REPAIRED ROAD

[75] Inventors: William E. Uffner, Newark; Robert N. White, Etna, both of Ohio

[73] Assignee: Owens-Corning Fiberglas Corporation, Toledo, Ohio

[21] Appl. No.: 621,955

[22] Filed: Jun. 18, 1984

Related U.S. Application Data

[62] Division of Ser. No. 182,530, Aug. 29, 1980, Pat. No. 4,471,094.

[51] Int. Cl.⁴ .......................... E01C 3/00; E01C 5/12; E01C 5/18
[52] U.S. Cl. ...................... 404/31; 428/63; 428/247
[58] Field of Search ................ 525/289; 428/489, 63, 428/247; 524/474, 534, 79; 404/31

[56] References Cited

U.S. PATENT DOCUMENTS 2,578,001 12/1951 Cubberley et al. .
2,610,162 9/1952 Hoffman .
2,884,400 4/1959 Moore ........................... 260/27 BB
3,338,849 8/1967 Johnson .
3,741,856 6/1973 Hurst .
3,900,102 8/1975 Hurst .
3,932,341 1/1976 Kutch .
4,113,799 9/1978 Van Ornum et al. .......... 260/27 BB
4,169,822 10/1979 Kutch et al. ................... 260/27 BB
4,174,992 11/1979 Fujii et al. ............................ 260/2.3

FOREIGN PATENT DOCUMENTS 51-61537  5/1976 Japan ................................... 524/474
 824760 12/1959 United Kingdom .
1285541  8/1972 United Kingdom .

OTHER PUBLICATIONS

Bituthene Waterproofing Systems, W. R. Grace & Co.
Heavy Duty Bituthene, W. R. Grace & Co.

Primary Examiner—Allan M. Lieberman
Attorney, Agent, or Firm—Ronald C. Hudgens; Robert F. Rywalski; Keith V. Rockey

[57] ABSTRACT

A primer composition for use in the bonding of asphalts comprising the reaction product of an elastomer and a terpene resin. The primer composition of this invention can be used in the treatment of substrates to which asphalts are bonded to improve the bonding relationship between the substrate and the asphalt, such as in road-paving applications, roofing applications and the like.

4 Claims, No Drawings

PRIMER COMPOSITION FOR A LAMINATED REPAIRED ROAD

This is a division of application Ser. No. 182,530, filed Aug. 29, 1980, now U.S. Pat. No. 4,471,094.

This invention relates to primer compositions, and more specifically to primer compositions for use in improving the bonding relationship between asphalts and substrates to which the asphalts are bonded.

In copending application Ser. No. 167,986, filed July 14, 1980, now abandoned, the disclosure of which is incorporated herein by reference, there is disclosed a chemically-modified asphalt composition which is suitable for use as an adhesive. The adhesive composition described in the foregoing application is prepared by reacting an asphalt with a polymerizable vinyl aromatic monomer such as styrene and a depolymerized rubber, either alone or in combination with a rubbery polymer, and optionally a terpene resin. The resulting composition has been found to be highly suitable in bonding a rubberized asphalt composite reinforced with glass fibers to a substrate in, for example, road-paving, road repair and roofing applications.

It has now been found that the adhesion between the composites coated with the chemically-modified asphalt as described in the foregoing application and a substrate can be significantly increased where the substrate is treated with a primer composition which is compatible with the asphalt and with the substrate.

It is accordingly an object of the present invention to provide a primer composition for use in improving the bonding relationship between asphalt adhesives and substrates to which they are bonded.

It is a more specific object of the present invention to provide a primer composition for use in the coating of substrates to deposit on the substrate a modified rubber composition to improve the bonding relationship between the asphalt and the substrate.

The concepts of the present invention reside in a primer composition for use in improving the bonding of asphalt to substrates wherein the primer composition is prepared by reacting an elastomer with a terpene resin. It has been found that the primer composition of this invention, when applied to a substrate to which a chemically-modified asphalt is to be bonded, serves to increase the adhesion between the chemically-modified asphalt and the substrate and to decrease the temperature at which adhesion between the substrate and the asphalt composite can be effected.

In the practice of the present invention, an elastomer is reacted with a terpene resin, and the resulting composition is then dispersed in a suitable solvent, thus permitting the reaction product to be applied as a coating on the surface of the substrate to which the rubberized asphalt composite is to be bonded. The elastomer employed as one of the reactants in the present invention is preferably a depolymerized rubber. The term "depolymerized rubber", as used herein, is intended to include and refer to a number of commercially available, low molecular weight natural and synthetic polymers. Depolymerized rubbers are generally rubbers which have been deploymerized to reduce their molecular weight by treatment with a depolymerizing agent, such as alkali; the rubbers which can be depolymerized include not only natural rubber but also synthetic rubbers, such as depolymerized synthetic conjugated diene polymers (e.g., depolymerized synthetic polyisoprene, depolymerized synthetic polybutadiene and depolymerized synthetic polychloroprene). Generally, depolymerized rubbers employed in the practice of this invention have average molecular weights ranging from 10,000 to 110.000. Various depolymerized rubbers are available commercially, including deploymerized rubbers available from Hardman Chemicals under the trademarks "Isolene", which are comprised of a series of depolymerized virgin synthetic polyisoprene polymers and the various "DPR" rubbers which are deploymerized natural rubbers. In general, such depolymerized rubbers are in the liquid state at ambient temperatures, and are quite tacky.

The depolymerized rubbers as described above are reacted with a terpene resin which can be any one of a number of synthetic polyterpene resins commercially available. Suitable resins include the polyterpene resins marketed by Goodyear Chemicals under the trademark "Wingtack", including the Wingtack 95 resin, a synthetic polyterpene derived from $C_5$ hydrocarbon resins. Another Wingtack resin useful in the practice of this invention is Wingtack 115, a resin chemically similar to Wingtack 95, excpet that Wingtack 115 has been polymerized to a higher softening point. Another series of terpene resins suitable for use in the practice of this invention are the terpene resins manufactured by the Hercules Incorporated under the trademark "Piccolyte", including the A100, A115, A125 and A135 resins. Those are derived from the monomer alpha-pinene, and have melt viscosities ranging from 185°-220° C. at 1 poise. Yet another series of terpene resins which can be used in the practice of this invention are the terpene resins marketed by Neville Chemical Company under the trademark "Nevpene", such as Nevpene 9500.

The reaction is carried out by simply blending the rubber and the polyterpene resin at a temperature sufficient to enable the reaction between the two to take place. In general, use can be made of reaction temperatures ranging from 50°-300° F., with higher temperatures being possible to provide reduced reaction times.

The relative proportions between the rubber and the terpene resin can be varied within wide ranges, and generally are not critical to the practice of the invention. In general, best results are usually obtained when the composition is formulated of 5-40% by weight of the rubber and 95-60% by weight of the polyterpene resin. If desired, suitable solvents for the reactants can be employed in carrying out the invention. In general, when use is made of a solvent for each of the two reactants, the solvent is a hydrocarbon, hexane being frequently preferred.

It is also possible, and sometimes desirable, to include in the reaction mixture, a non-deploymerized elastomer. As the non-depolymerized rubber or elastomer, use can be made of a number of elastomeric materials well known to those skilled in the art. Included are both natural rubbers and synthetic rubbers. Suitable synthetic rubbers are homopolymers of conjugated dienes (i.e., butadiene, isoprene, chloroprene, etc.) as well as elastomeric materials formed by copolymerization of one or more of the foregoing conjugated dienes with one or more ethylenic monomers such as styrene, acrylonitrile, methacrylonitrile, acrylic acid, methacrylic acid, etc. Included in the latter category are butadiene-styrene rubbers, butadiene-acrylonitrile rubbers and acrylonitrile-butadiene-styrene rubbers. Particularly well suited for use in the practice of this invention when a non-depolymerized is employed is the butadiene-styrene rubber marketed by Philips Petroleum under the trademark "Solprene 1205C".

The amount of the non-depolymerized elastomer is similarly not critical to the practice of the invention, and can be varied within relatively wide ranges. In general, good results are obtained when the non-depolymerized rubber varies from 1 to 30% by weight of the composition based on the total weight of the composition.

As is indicated above, the primer composition of this invention is particularly useful as a primer to secure a bonding relationship between a glass fiber-asphalt composite of the sort described in the foregoing copending application Ser. No. 167,986. As described in that application, the composite is formed of a bundle of glass fibers which has been coated, or impregnated, with a non-tacky rubber-modified asphalt composition of the type described in copending application Ser. No. 45,047, filed June 4, 1979. In general, the bundle of glass fibers serving as reinforcement for the non-tacky rubber-modified asphalt are preferably present in the form of a woven roving such that the composite has the configuration of a road repair laminant, mat or membrane to be laid down over a substrate whereby the mat is then overlaid with, for example, a wear surface of, for example, asphalt. To insure adhesion between the composite is an adhesive coating on one surface of the mat, with the adhesive coating being formed of the reaction product of asphalt, a polymerizable vinyl aromatic monomer and depolylmerized rubber as described in copending application Ser. No. 167.986. As described in that copending application, the reaction product may also be blended with a terpene resin to enhance the tackiness of the coating as an adhesive.

The primer composition of this invention is simply applied as a thin coating on the substrate, whether it be a concrete, asphalt or brick substrate. The primer composition of this invention thus serves to coat the substrate and is compatible with the adhesive coating on drying to insure that the mat having the adhesive coating on one face thereof is securely bonded to the substrate.

For that purpose, the substrate should be coated with a quantity of the primer composition of this invention to establilsh a secure bonding relationship between the substrate and the adhesive coating on the mat. In general, the coating has a minimum thickness of 1 mil, and can range up to an inch or more, although thick coatings of the primer composition of the invention generally afford no greater advantage.

Preferably the primer compositions of the present invention are applied unto a substrate as a solvent solution suitably containing about 5–15% by weight of solids. Outstanding results are obtained using 10–12% solids. Numerous solvents including aromatics, e.g. xylene, toluene, naptha, alkanols including cyclic alkanols like cydohexanol, aliphatics including hydrocarbons and chlorinated hydrocarbons are suitable. Hexane is an especially outstanding solvent as it has the needed solvation power and presents a fine balance between a short drying, or evaporation time, and a relatively high flash point.

In the preferred mode of practicing this invention roads are repaired, or even constructed, by applying the primer composition to a road substrate, e.g. concrete, asphalt, brick and the like, and after solvent evaporation a road repair membrane is positioned in direct contact with the primer. If, for example, cracks are also being repaired, a suitable repair binder, e.g. asphalt or ROADBOND TM binder, a product of the assignee of this invention, will be dispensed into the crack and the primer then applied to the substrate adjacent the filled crack. The road repair membrane, or laminant, preferably comprises a fibrous reinforcement material which has been coated, or impregnated, on both sides, as by dipping, with a substantially non-tacky chemically-modified asphalt, the membrane also being provided, as by coating on one side thereof, with a layer of the adhesive which serves to tenaciously enhance the membrane bonding to the primer.

Desirably the membrane will be sufficiently flexible to allow it to be formed into rolls and in order to protect the adhesive layer and prevent membrane adherence in the rolled form prior to the time of use, the adhesive layer will be covered with a suitable removable, or releaseable, skin as in the form of a tear-away strip. Reference herein to substantially non-tacky means that at room temperature the chemically-modified asphalt has significantly less tack than the adhesive.

Exemplary fibrous reinforcement materials are various mats including chopped strand mats, continuous strand mats, swirl mats, woven and non-woven fabrics, e.g., woven rovings, insect screening, scrim and the like. Preferably the fibrous materials are glass but they may also be organic polymeric materials or combinations of glass and organic polymers. Outstanding results are obtained when the non-tacky chemically-modified asphalt is the reaction product of asphalt, non-depolymerized rubber and a polymerizable vinyl aromatic monomer; the latter may be an admixture of monofunctional and polyfunctional vinyl monomers. Further details may be found in copending applications Ser. No. 045,047 and Ser. No. 144,711 both of which are hereby incorporated by reference. Suitably the non-tacky chemically-modified asphalt coating is applied to the reinforcement material by dipping the latter into a hot melt of the former. The coated membrane may then be cooled and the adhesive applied to one side. The releaseable skin is then applied to the adhesive layer. The adhesive may likewise be applied as a hot melt. One suitable releaseable skin is a polyethylene coated kraft paper which has a silicone overcoat which is available from Daubert Paper Co. as their product 1-60-EKPL-164. The membrane is then preferably rolled upon itself to form a roll for on site use in road repairs by applying it to the primer.

Having described the basic concepts of the invention, reference is now made to the following examples, which are provided by way of illustration, and not by way of limitation, of the practice of the present invention in formulating a primer composition and its use in promoting a secure bonding relationship between an adhesive coating mat and a substrate over which the mat is laid down.

EXAMPLE 1

This example illustrates the preparation of a primer composition embodying the concepts of this invention.

A primer batch is formulated as follows:

|  | Parts by weight |
| --- | --- |
| Depolymerized natural rubber (DPR-400) | 60 |
| Depolymerized natural rubber | 6 |

| | Parts by weight |
|---|---|
| (XL-01) (From Hardman Chemicals) | |
| Terpene resin (Piccolyte A-115 resin) | 229 |

The above batch is cooked at 165° F. for 4 hours. Thereafter, the reaction product is blended with hexane to form a primer formulation of about 10%–12% by weight of solids, which is then applied to a road surface. Thereafter, glass fibers (in the form of a woven roving coated on both sides by dipping in a chemically-modified asphalt and then coated on one side with an adhesive formed by the reaction of asphalt, styrene a rubbery polymer, a depolymerized rubber and a terpene resin) is laid down over the primed surface with the adhesive in direct contact with the primer. It is found that the adhesion is improved by 15–30% as compared to the same surface which has not been coated with a primer. In addition, adhesion is achieved at temperatures 10° F. to 15° F. lower than the temperatures required to secure adhesion to the same surface which had not been coated with a primer.

EXAMPLE 2

This example illustrates the preparation of a primer composition of the invention which has been formulated to include a non-depolymerized rubber, namely Solprene 1205C, a butadiene-styrene rubber.

A primer batch is formulated as follows:

| | Parts by weight |
|---|---|
| Depolymerized natural rubber (XL-01) | 1 |
| Butadiene-styrene rubber (Solprene 1205C) | 10 |
| Nevpene (9500) | 20 |
| Naphtha (55° F.) | 100 |

The above formulation was made at room temperataure and was allowed to stand for 24 hours. Mixing is used to cause the depolymerized rubber to go into solution.

The resulting primer composition is then applied to a stainless steel sheet at a thickness of 0.006 in., and a glass-reinforced mat of treated asphalt applied to it. The adhesion between the mat and the stainless steel substrate is improved as compared to a stainless steel substrate which had not been coated with the primer.

It will be understood that various modifications can be made in the details of procedure, formulation and use without departing from the spirit of the invention, especially as defined in the following claims.

We claim:

1. A laminated repaired road comprising a substrate, a primer on said substrate, said primer consisting essentially of the reaction product of 5 to 40% by weight of a liquid, tacky, depolymerized diene rubber having an average molecular weight below 110,000, and 95 to 40% by weight of a terpene resin, and a fibrous reinforced road repair membrane having an adhesive layer on one side thereof, said adhesive layer being in adhered contact with said primer.

2. The repaired road of claim 1 wherein said substrate is asphalt.

3. A road as defined in claim 1 wherein the terpene resin is a synthetic polyterpene derived from a $C_5$ hydrocarbon resin.

4. A road as defined in claim 1 wherein the primer also contains non-depolymerized rubber.

* * * * *